(12) United States Patent
Lee

(10) Patent No.: US 11,470,852 B2
(45) Date of Patent: Oct. 18, 2022

(54) METHOD OF MANUFACTURING A FERMENTED COFFEE FORMULATION

(71) Applicant: Peter Kyoung Lee, Lawrenceville, GA (US)

(72) Inventor: Peter Kyoung Lee, Lawrenceville, GA (US)

(*) Notice: Subject to any disclaimer, the term of this patent is extended or adjusted under 35 U.S.C. 154(b) by 370 days.

(21) Appl. No.: 16/837,892

(22) Filed: Apr. 1, 2020

(65) Prior Publication Data

US 2021/0186044 A1    Jun. 24, 2021

Related U.S. Application Data

(60) Provisional application No. 62/953,047, filed on Dec. 23, 2019.

(51) Int. Cl.
| | |
|---|---|
| *A23F 5/02* | (2006.01) |
| *A23F 5/10* | (2006.01) |
| *A23F 5/46* | (2006.01) |
| *C12G 3/02* | (2019.01) |
| *C12G 3/055* | (2019.01) |

(52) U.S. Cl.
CPC .............. *A23F 5/02* (2013.01); *A23F 5/10* (2013.01); *A23F 5/46* (2013.01); *C12G 3/02* (2013.01); *C12G 3/055* (2019.02)

(58) Field of Classification Search
CPC ..... A23F 5/02; A23F 5/10; A23F 5/46; C12G 3/02; C12G 3/055
See application file for complete search history.

(56) References Cited

U.S. PATENT DOCUMENTS

| | | | |
|---|---|---|---|
| 2007/0128326 A1* | 6/2007 | Milo | A23L 2/39 426/594 |
| 2009/0104310 A1* | 4/2009 | Nakajima | A23F 5/02 426/595 |
| 2010/0143539 A1* | 6/2010 | Minami | A23F 5/02 426/594 |
| 2012/0321772 A1* | 12/2012 | Fujiwara | A23F 5/486 426/534 |
| 2012/0321774 A1* | 12/2012 | Fujiwara | A23F 5/465 426/595 |
| 2016/0058028 A1* | 3/2016 | Saerens | C12N 1/16 426/45 |
| 2019/0256810 A1* | 8/2019 | Leutz | C12G 3/02 |

* cited by examiner

*Primary Examiner* — Anthony J Weier

(57) ABSTRACT

A system and method of manufacturing a fermented coffee formulation produces roasted and fermented coffee beans, fermented coffee juice, and a fermented coffee oil. The system includes a quantity of unprocessed coffee fruit, a quantity of primary fermentation blend, a supplemental fermentation blend, a first container, a second container, a roasting machine, and a cooling tray. The method begins by fermenting the quantity of unprocessed coffee fruit with the primary fermentation blend in the first container for coffee cherry juice. Then, a quantity of fermented coffee beans is separated from a quantity of fermented coffee fruit. In order to produce coffee beans, the quantity of fermented coffee beans is lightly roasted with the roasting machine, cooled with the cooling tray, and fermented again with the supplemental fermentation blend in the second container. A quantity of reroasted-and-refermented coffee beans is produced with the roasting machine. Fermented coffee oil is then extracted.

19 Claims, 8 Drawing Sheets

METHOD OF MANUFACTURING A FERMENTED COFFEE FORMULATION

The current application claims priority to U.S. provisional application Ser. No. 62/953,047 filed on Dec. 23, 2019.

FIELD OF THE INVENTION

The present invention generally relates to manufacturing a fermented coffee formulation. More specifically, the present invention produces a quantity of robust roasted and fermented coffee beans, fermented coffee juice, and fermented coffee oil.

BACKGROUND OF THE INVENTION

Coffee is a common beverage that may be consumed for a variety of reasons. Some may drink coffee in order to feel more awake and energized. Some may drink coffee with dessert or drink coffee over conversation. Some may drink coffee for digestion and to suppress hunger. For whatever reason that an individual may consume coffee, the best quality of coffee is always desired in any situation. Fermented coffee is an increasingly popular form of coffee that attempts to improve gut health. Ways to consume fermented coffee, however, is quite limited.

The present invention serves not only to provide more flavorful coffee but also utilize the benefits of fermented coffee of enhanced gut health. The present invention provides the coffee flavor in a variety of beverages. The present invention allows coffee to be brewed with roasted and fermented coffee beans. The present invention may be infused with fermented coffee and consumed as a chilled or warmed juice beverage. The present invention may be added as an extract to other beverages or baked and cooked goods. The present invention provides the benefits of fermented coffee in a variety of forms so that the present invention may be consumed for any number of reasons in any type of setting.

DETAIL DESCRIPTIONS OF THE INVENTION

All illustrations of the drawings are for the purpose of describing selected versions of the present invention and are not intended to limit the scope of the present invention.

Figure 1:
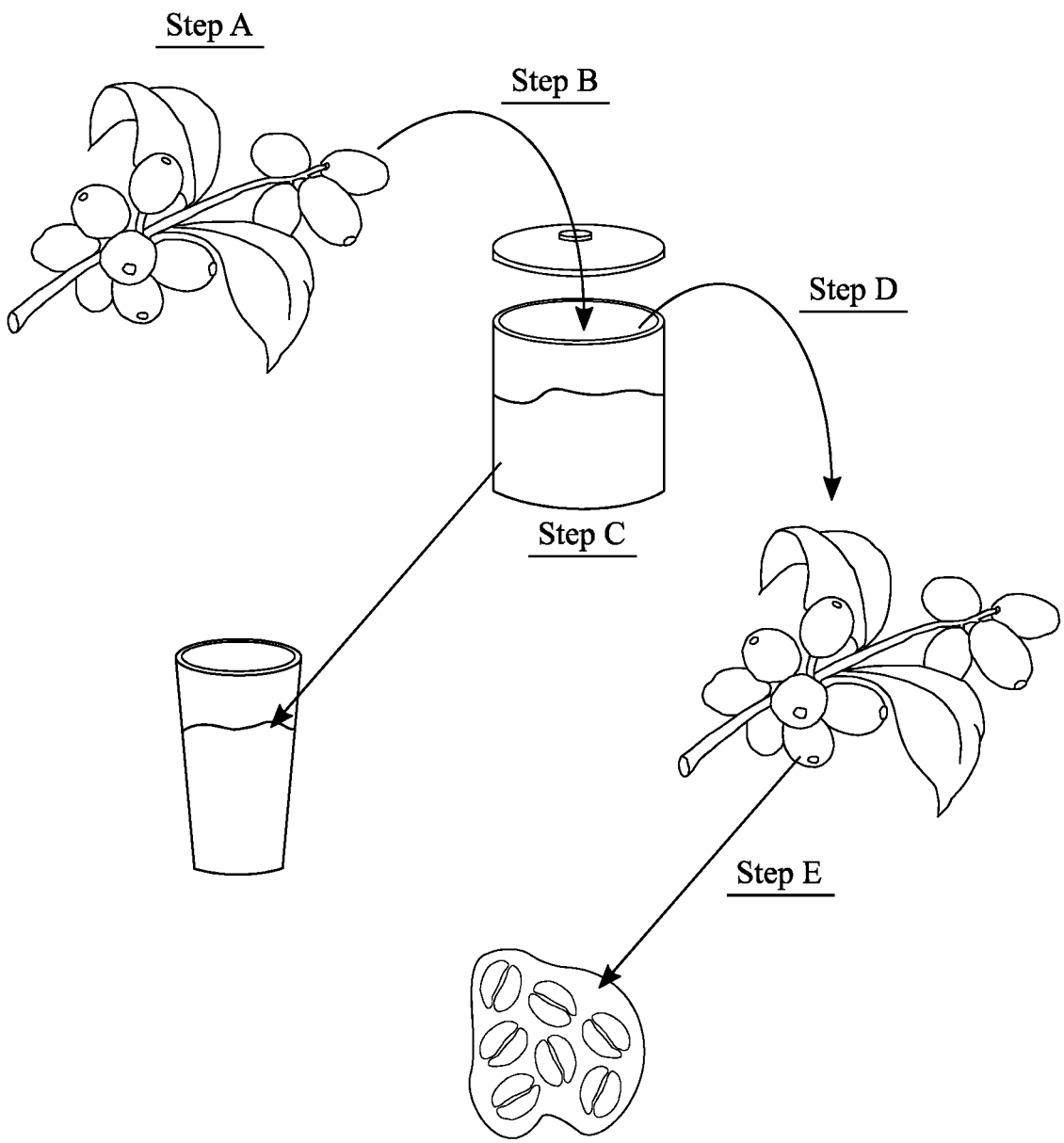
FIG. 1 is a schematic view for a cherry coffee juice system and a quantity of fermented coffee beans of the present invention.

The present invention is a system and method of manufacturing a fermented coffee formulation. The method produces a variety of coffee products including roasted and fermented coffee beans, fermented coffee juice, and fermented coffee oil. The variety of coffee products enhances the coffee flavor for a robust taste and is beneficial for overall gut health. Thus, the physical system used to implement this method includes a quantity of unprocessed coffee fruit, a quantity of primary fermentation blend, a quantity of supplemental fermentation blend, a first container, a second container, a roasting machine, and a cooling tray (Step A), seen in FIG. 1, FIG. 2, and FIG. 3. The quantity of unprocessed coffee fruit serves to infuse juice for a robust coffee flavor as well as provide coffee beans for fermentation. The quantity of primary fermentation blend ferments the unprocessed coffee fruit and creates the coffee-infused juice. The quantity of primary fermentation blend includes a quantity of sugar and a quantity of apple cider. The quantity of apple cider provides the necessary acidity that, together, with quantity of sugar adds to the complexity and depth of coffee flavor. The first container is used to retain the quantity of unprocessed coffee fruit and the primary fermentation blend for the juice. The second container is used to retain fermented coffee beans and the quantity of supplemental fermentation blend for thoroughly fermented coffee beans. The quantity of supplemental fermentation blend includes a quantity of sugar and a quantity of apple cider. The quantity of supplemental fermentation serves to further ferment the coffee beans that are extracted from the quantity of unprocessed coffee fruit, increasing the fermentation benefits with the coffee beans. The quantity of sugar is approximately 50% volume (vol). of the quantity of supplemental fermentation blend at normal temperature and pressure (NTP), wherein the term "approximately" preferably means within an error range of up to ±5% vol. The quantity of apple cider is approximately 50% vol. of the quantity of supplemental fermentation blend at NTP, wherein the term "approximately" preferably means within an error range of up to ±5% vol. Both the first container and the second container are preferably sealed with a lid throughout the fermentation of the juice and coffee beans, respectively. The roasting machine roasts coffee beans that are ready for brewing, while the cooling tray is used to evenly and thoroughly cool and dry coffee beans that have been recently roasted.

Figure 4:
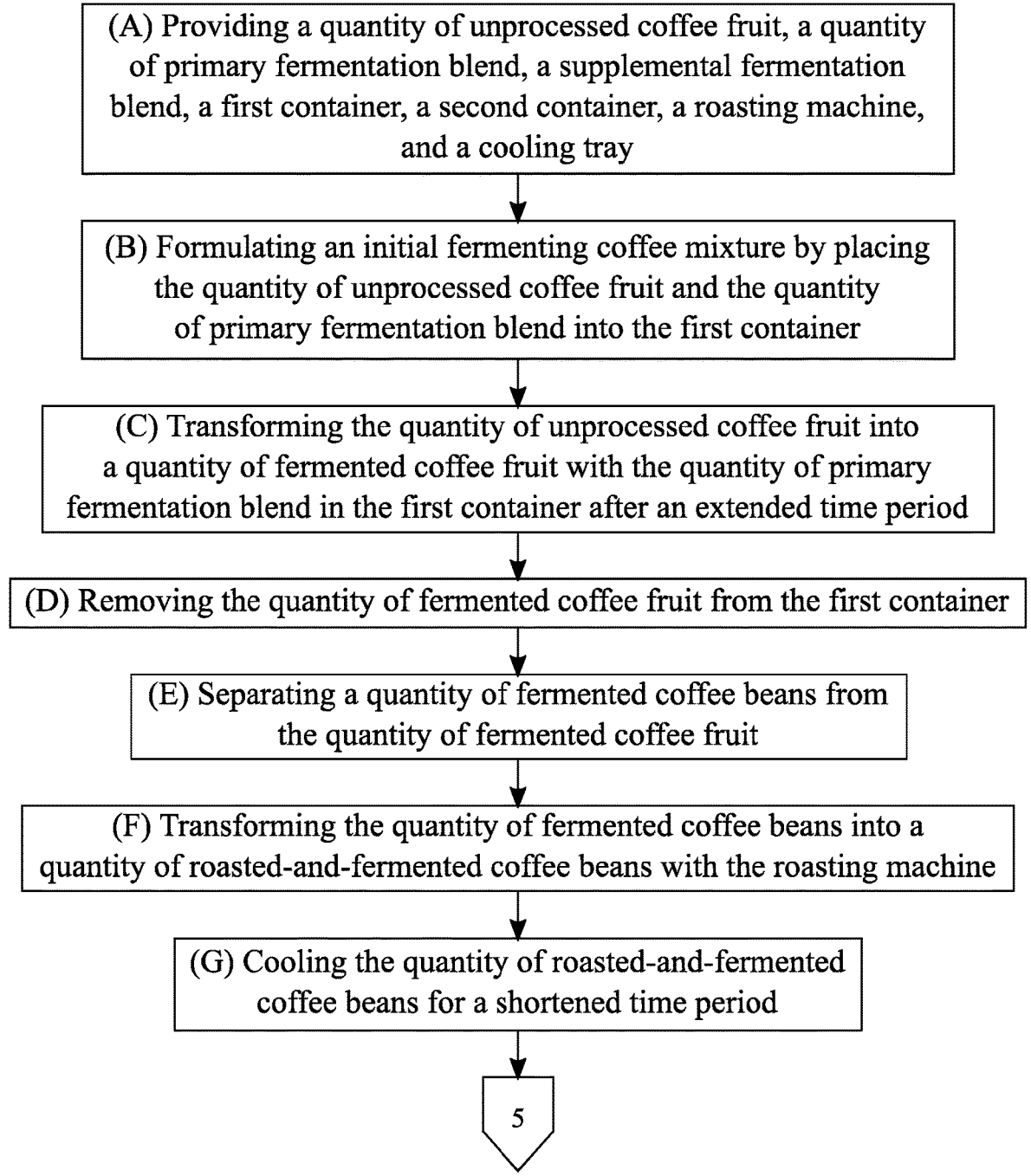
FIG. 4 is a flowchart illustrating the overall process for a method of the present invention.

The overall process for the method of the present invention includes the following steps that are implemented with the quantity of unprocessed coffee fruit, the quantity of primary fermentation blend, the supplemental fermentation blend, the first container, the second container, the roasting machine, and the cooling tray. An initial fermenting coffee mixture is formulated by placing the quantity of unprocessed coffee fruit and the quantity of primary fermentation blend into the first container (Step B), seen in FIG. 1 and FIG. 4. The initial fermenting coffee mixture allows the quantity of primary fermentation blend to be infused with the coffee flavor with the quantity of unprocessed coffee fruit. In the preferred embodiment of the present invention, the quantity of unprocessed coffee fruit is approximately 33% vol. of the initial fermenting coffee mixture at NTP, wherein the term "approximately" preferably means within an error range of up to ±5% vol. The quantity of sugar is approximately 33% vol. of the initial fermenting coffee mixture at NTP, wherein the term "approximately" preferably means within an error range of up to ±5% vol. The quantity of apple cider is approximately 33% vol. of the initial fermenting coffee mixture at NTP, wherein the term "approximately" preferably means within an error range of up to ±5% vol. The quantity of unprocessed coffee fruit is transformed into a quantity of fermented coffee fruit with the quantity of primary fermentation blend in the first container after an extended time period (Step C). The extended time period is preferably about 3 months in order for the quantity of primary fermentation blend to be fully ferment the quantity of unprocessed coffee fruit into the quantity of fermented coffee fruit. The quantity of fermented coffee fruit is now able to provide the benefits for gut health for brewed coffee. The quantity of fermented coffee fruit is removed from the first container (Step D), and a quantity of fermented coffee beans is separated from the quantity of fermented coffee fruit (Step E) in order to produce brewed coffee with the flavor and health benefits of fermentation. The quantity of fermented coffee beans is transformed into a quantity of roasted-and-fermented coffee beans with the roasting machine (Step F), further sealing and locking in the flavor of the coffee and fermentation, seen in FIG. 2 and FIG. 4. Moreover, this first roast during Step F produces lightly-roasted coffee beans. The quantity of roasted-and-fermented coffee beans is cooled for a shortened time period (Step G) for a second fermentation for the quantity of roasted-and-fermented coffee beans. The shortened time period is preferably about 1 hour.

Figure 2:
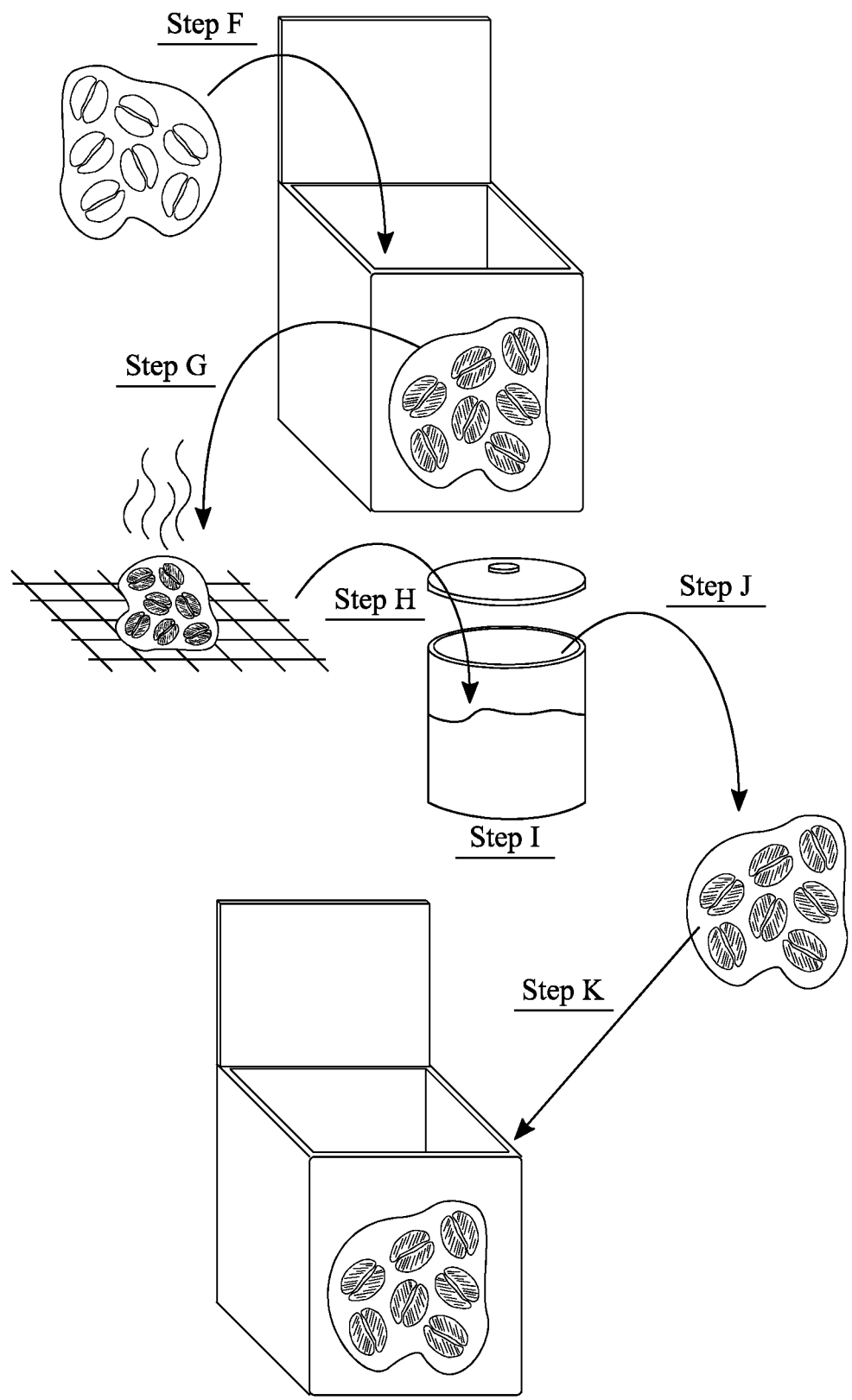
FIG. 2 is a schematic view for a quantity of reroasted-and-refermented coffee beans of the present invention.
Figure 5:
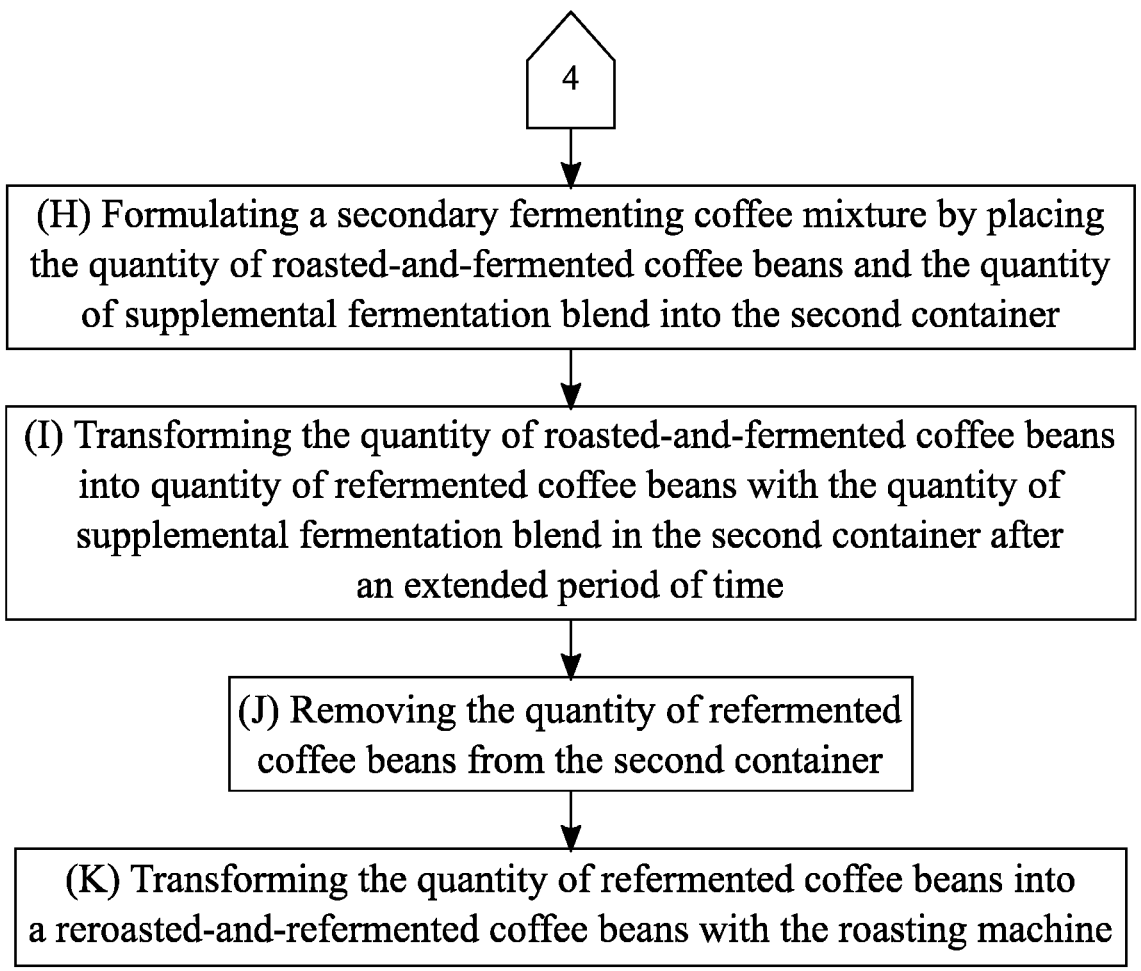
FIG. 5 is a continuation of FIG. 4.

The overall process continues by formulating a secondary fermenting coffee mixture is by placing the quantity of roasted-and-fermented coffee beans and the quantity of supplemental fermentation blend into the second container (Step H), seen in FIG. 2 and FIG. 5. The secondary fermenting coffee mixture allows the roasted-and-fermented coffee beans to ferment again for enhanced flavor and health benefits. In the preferred embodiment of the present invention, the quantity of roasted-and-fermented coffee beans is approximately 50% of the secondary fermenting coffee mixture at NTP, and the quantity of supplemental fermentation blend is approximately 50% vol. of the secondary fermenting coffee mixture at NTP, wherein the term "approximately" preferably means within an error range of up to ±5% vol. The quantity of roasted-and-fermented coffee beans is transformed into a quantity of refermented coffee beans with the quantity of supplemental fermentation blend in the second container after another extended period of time (Step I). Similarly, the other extended time period is approximately 3 months. The quantity of refermented-and-refermented coffee beans provides robust flavor with a medium-to-dark roast. The quantity of refermented coffee beans is removed from the second container (Step J) and is transformed into a quantity of reroasted-and-refermented coffee beans with the roasting machine (Step K) to lock in the fermented flavor and darker roast, seen in FIG. 2 and FIG. 5.

Figure 6:
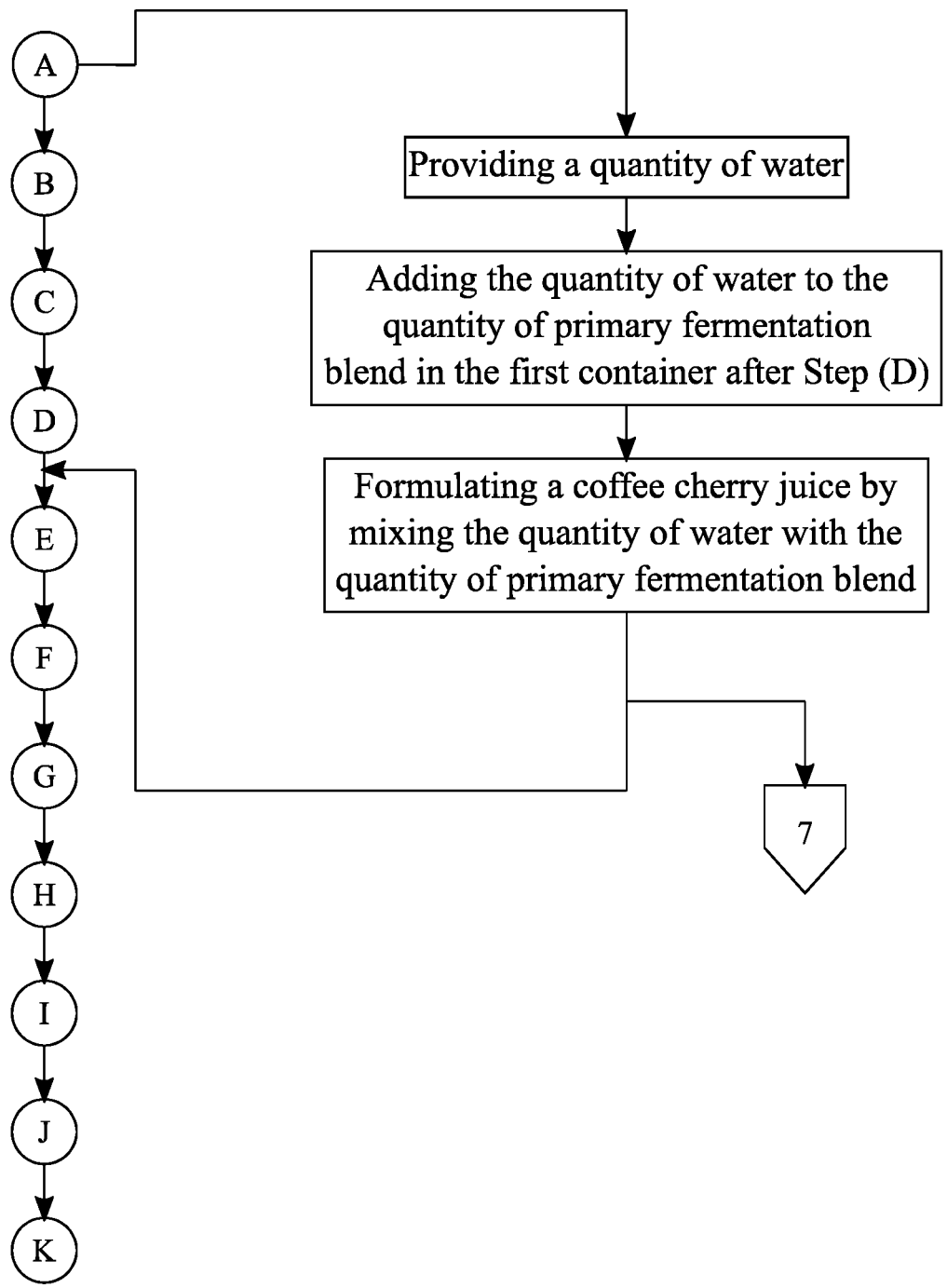
FIG. 6 is a flowchart illustrating the subprocess for producing a coffee cherry juice.
Figure 7:
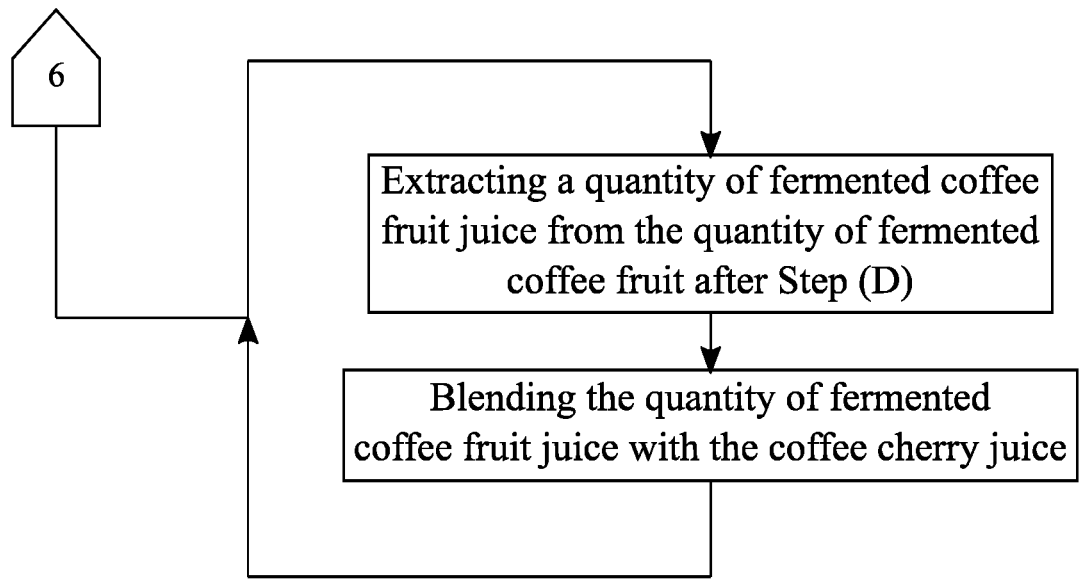
FIG. 7 is a flowchart illustrating the subprocess for enhancing the coffee cherry juice with a quantity of fermented coffee fruit juice.

The primary fermentation blend may be directly consumed by providing a quantity of water, seen in FIG. 6. The quantity of water slightly dilutes the primary fermentation blend for a better taste and gentler effects with the gut. The quantity of water may vary in temperature according to the preference of the user. The quantity of water is added to the quantity of primary fermentation blend in the first container step after Step D. A coffee cherry juice is formulated by mixing the quantity of water with the quantity of primary fermentation blend. The coffee cherry juice provides the flavor of coffee in a fermented juice that aids in gut health maintenance. In the preferred embodiment of the present invention, the quantity of water is approximately 33% vol. of the coffee cherry juice at NTP, the quantity of sugar is approximately 33% vol. of the coffee cherry juice at NTP, and the quantity of apple cider is approximately 33% vol. of the coffee cherry juice at NTP, wherein the term "approximately" preferably means within an error range of up to ±5% vol. The equal portions preserve the intensity of flavor while allowing the coffee cherry juice to be easily consumed. In order to enhance the flavor of the coffee cherry juice, a quantity of fermented coffee fruit juice is extracted from the quantity of fermented coffee fruit after Step D, as seen in FIG. 7. More specifically, the quantity of fermented coffee fruit juice is an extract from the remainder of the quantity of fermented coffee fruit after Step E. The quantity of fermented coffee fruit juice is blended with the coffee cherry juice for a more saturated coffee flavor with the coffee cherry juice.

Figure 3:
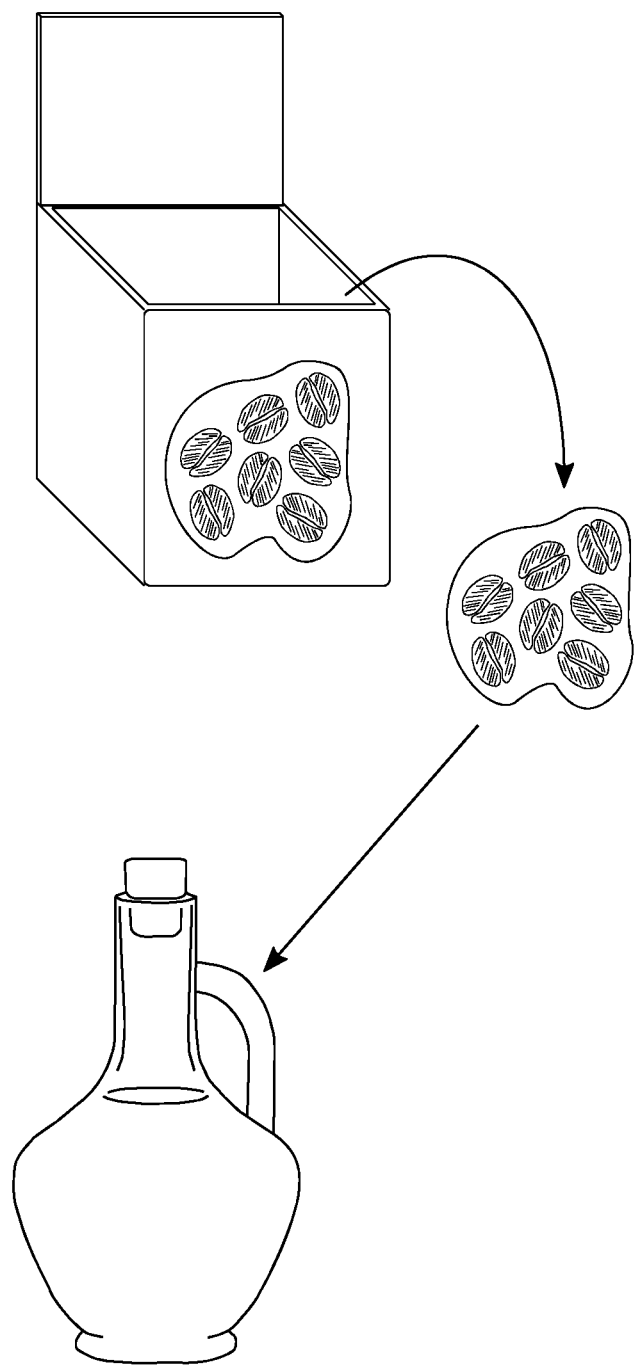
FIG. 3 is a schematic view for a quantity of fermented coffee oil of the present invention.
Figure 8:
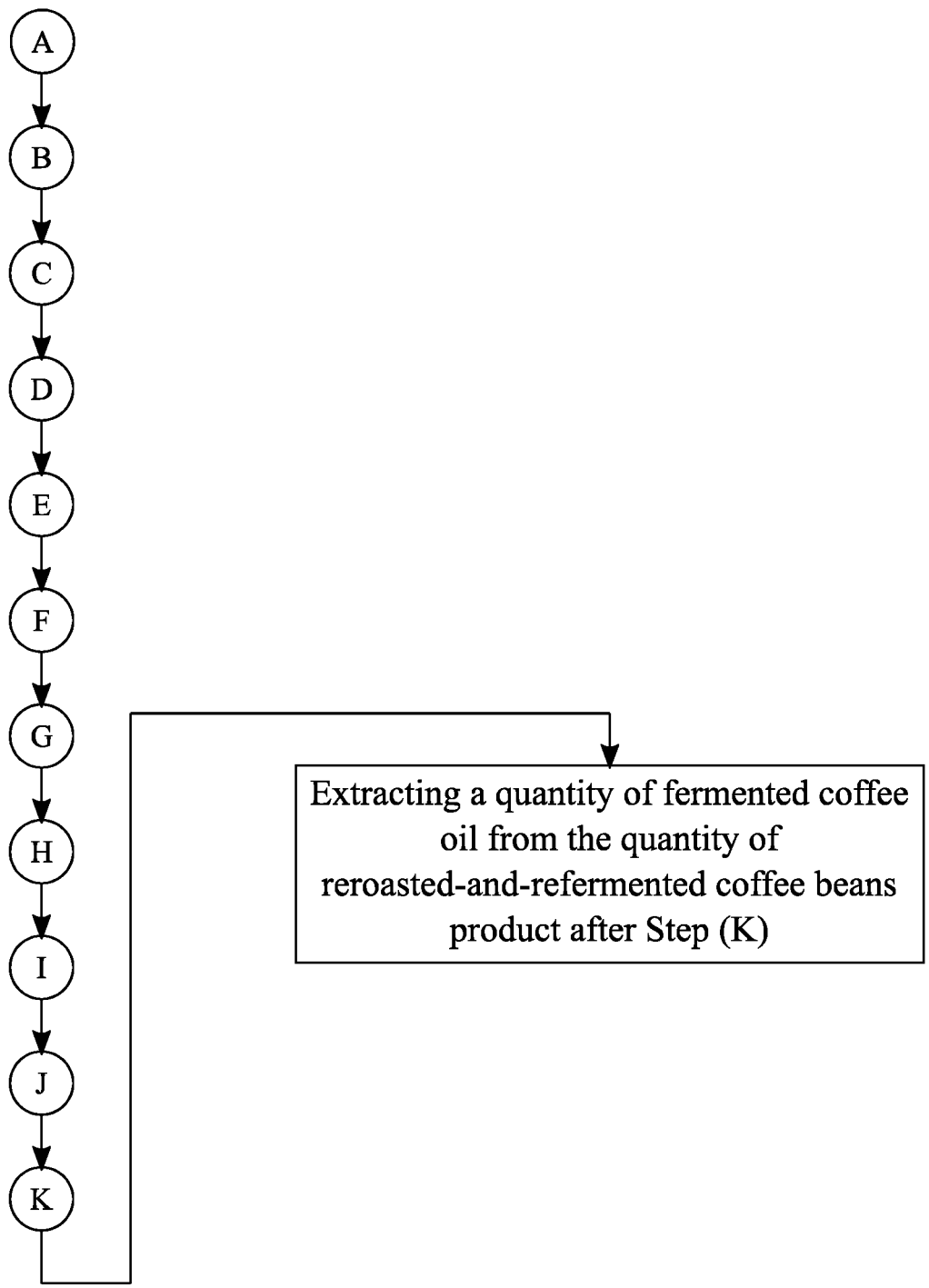
FIG. 8 is a flowchart illustrating the subprocess for producing a fermented coffee oil.

In order to supplement a food item or beverage with the present invention, a quantity of fermented coffee oil is extracted from the quantity of reroasted-and-refermented coffee beans product after Step K, seen in FIG. 3 and FIG. 8. The quantity of fermented coffee oil provides the medium-to-dark roast flavor and further fermented flavor for other compatible beverages, baked goods, and cooked food items.

Although the invention has been explained in relation to its preferred embodiment, it is to be understood that many other possible modifications and variations can be made without departing from the spirit and scope of the invention as hereinafter claimed.

What is claimed is:

1. A method of manufacturing a fermented coffee formulation, the method comprises the steps:
    (A) providing a quantity of unprocessed coffee fruit, a quantity of primary fermentation blend, a quantity of supplemental fermentation blend, a first container, a second container, a roasting machine, and a cooling tray;
    (B) formulating an initial fermenting coffee mixture by placing the quantity of unprocessed coffee fruit and the quantity of primary fermentation blend into the first container;
    (C) transforming the quantity of unprocessed coffee fruit into a quantity of fermented coffee fruit with the quantity of primary fermentation blend in the first container after an extended time period;
    (D) removing the quantity of fermented coffee fruit from the first container;
    (E) separating a quantity of fermented coffee beans from the quantity of fermented coffee fruit;
    (F) transforming the quantity of fermented coffee beans into a quantity of roasted-and-fermented coffee beans with the roasting machine;
    (G) cooling the quantity of roasted-and-fermented coffee beans for a shortened time period;
    (H) formulating a secondary fermenting coffee mixture by placing the quantity of roasted-and-fermented coffee beans and the quantity of supplemental fermentation blend into the second container;
    (I) transforming the quantity of roasted-and-fermented coffee beans into a quantity of refermented coffee beans with the quantity of supplemental fermentation blend in the second container after another extended period of time;
    (J) removing the quantity of refermented coffee beans from the second container; and,
    (K) transforming the quantity of refermented coffee beans into a reroasted-and-refermented coffee beans with the roasting machine; and
        extracting a quantity of fermented coffee oil from the quantity of reroasted-and-refermented coffee beans product after Step (K).

2. The method of manufacturing a fermented coffee formulation the method as claimed in claim 1 comprises the steps of:
  providing a quantity of water;
  adding the quantity of water to the quantity of primary fermentation blend in the first container after Step (D); and,
  formulating a coffee cherry juice by mixing the quantity of water with the quantity of primary fermentation blend.

3. The method of manufacturing a fermented coffee formulation the method as claimed in claim 2 comprises the steps of:
  extracting a quantity of fermented coffee fruit juice from the quantity of fermented coffee fruit after Step (D); and,
  blending the quantity of fermented coffee fruit juice with the coffee cherry juice.

4. The method of manufacturing a fermented coffee formulation, the method as claimed in claim 2, wherein the quantity of primary fermentation blend includes a quantity of sugar and a quantity of apple cider.

5. The method of manufacturing a fermented coffee formulation, the method as claimed in claim 4, wherein the quantity of water is approximately 33% volume (vol.) of the coffee cherry juice at normal temperature and pressure (NTP).

6. The method of manufacturing a fermented coffee formulation, the method as claimed in claim 4, wherein the quantity of sugar is approximately 33% vol. of the coffee cherry juice at NTP.

7. The method of manufacturing a fermented coffee formulation, the method as claimed in claim 4, wherein the quantity of apple cider is approximately 33% vol. of the coffee cherry juice at NTP.

8. The method of manufacturing a fermented coffee formulation, the method as claimed in claim 1, wherein the quantity of unprocessed coffee fruit is approximately 33% vol. of the initial fermenting coffee mixture at NTP.

9. The method of manufacturing a fermented coffee formulation, the method as claimed in claim 1, wherein the quantity of primary fermentation blend includes a quantity of sugar and a quantity of apple cider.

10. The method of manufacturing a fermented coffee formulation, the method as claimed in claim 9, wherein the quantity of sugar is approximately 33% vol. of the initial fermenting coffee mixture at NTP.

11. The method of manufacturing a fermented coffee formulation, the method as claimed in claim 9, wherein the quantity of apple cider is approximately 33% vol. of the initial fermenting coffee mixture at NTP.

12. The method of manufacturing a fermented coffee formulation, the method as claimed in claim 1, wherein the quantity of supplemental fermentation blend includes a quantity of sugar and a quantity of apple cider.

13. The method of manufacturing a fermented coffee formulation, the method as claimed in claim 12, wherein the quantity of sugar is approximately 50% vol. of the quantity of supplemental fermentation blend at NTP.

14. The method of manufacturing a fermented coffee formulation, the method as claimed in claim 12, wherein the quantity of apple cider is approximately 50% vol. of the quantity of supplemental fermentation blend at NTP.

15. The method of manufacturing a fermented coffee formulation, the method as claimed in claim 1, wherein the quantity of roasted-and-fermented coffee beans is approximately 50% vol. of the secondary fermenting coffee mixture at NTP.

16. The method of manufacturing a fermented coffee formulation, the method as claimed in claim 1, wherein the quantity of supplementary fermentation blend is approximately 50% vol. of the secondary fermenting coffee mixture at NTP.

17. The method of manufacturing a fermented coffee formulation, the method as claimed in claim 1, wherein the extended time period is approximately 3 months.

18. The method of manufacturing a fermented coffee formulation, the method as claimed in claim 1, wherein the other extended time period is approximately 3 months.

19. The method of manufacturing a fermented coffee formulation, the method as claimed in claim 1, wherein the shortened time period is approximately 1 hour.

* * * * *